US 6,606,851 B1

(12) United States Patent
Herdy, Jr. et al.

(10) Patent No.: US 6,606,851 B1
(45) Date of Patent: Aug. 19, 2003

(54) TRANSPIRATION COOLING OF ROCKET ENGINES

(76) Inventors: Joseph Roger Herdy, Jr., 127 Markyle Dr., Owens Cross Roads, AL (US) 35763; Michel Roger Kamel, 11030 Drouart, Montreal, Quebec (CA), H3M2S3; Jacob Brian Lopata, 8556 Hamlin, Skokie, IL (US) 60076

( * ) Notice: Subject to any disclaimer, the term of this patent is extended or adjusted under 35 U.S.C. 154(b) by 0 days.

(21) Appl. No.: 09/946,630

(22) Filed: Sep. 6, 2001

Related U.S. Application Data
(60) Provisional application No. 60/231,335, filed on Sep. 8, 2000.

(51) Int. Cl.$^7$ .................................................. F02K 9/64
(52) U.S. Cl. ............................ 60/204; 60/257; 60/265; 29/890.01; 239/127.3
(58) Field of Search ........................... 60/204, 265, 257; 39/127.3; 29/890.01

(56) References Cited

U.S. PATENT DOCUMENTS 3,832,290 A    8/1974   Fortini
4,703,620 A    11/1987  Niino et al.
5,363,645 A  * 11/1994  Pellet ........................... 60/267
5,501,011 A    3/1996   Pellet
5,732,883 A    3/1998   Beaurain et al.
5,903,976 A    5/1999   Beaurain et al.
6,151,887 A  * 11/2000  Haidn et al. .................. 60/257
6,321,449 B2 * 11/2001  Zhao et al. .............. 29/890.01

FOREIGN PATENT DOCUMENTS

FR          2691209         11/1993

* cited by examiner

Primary Examiner—Ehud Gartenberg
(74) Attorney, Agent, or Firm—Hunton & Williams

(57) ABSTRACT

A rocket engine having a combustion chamber with a chamber inner wall, a throat with a throat inner wall, and a nozzle with a nozzle inner wall is provided. The chamber inner wall is a vacuum plasma sprayed metal, the throat inner wall is a vacuum plasma sprayed metal, and the nozzle inner wall is a vacuum plasma sprayed metal. The porosity of the vacuum plasma sprayed metal varies in an axial direction of the engine.

21 Claims, 4 Drawing Sheets

US 6,606,851 B1

TRANSPIRATION COOLING OF ROCKET ENGINES

This application claims the benefit of U.S. Provisional Application No. 60/231,335, filed Sep. 8, 2000.

BACKGROUND OF THE INVENTION

Embodiments of the invention relate to rocket engines. More particularly, embodiments of the invention relate to the cooling of rocket engines.

When in operation, rocket engines generate a significant amount of power in the form of heat. In order to keep a rocket engine from melting while maintaining high efficiency, a cooling system using one of the propellants is often incorporated into the engine. It is the job of the cooling system to maintain engine structural integrity while recycling the energy lost to the walls of the engine. This approach is called regenerative cooling because the heat absorbed by the coolant/propellant is eventually returned to the engine. In cooling a rocket engine the biggest challenge is in maintaining reasonable wall temperatures around the area of the throat. This is because the amount of heat that needs to be removed from the region of the throat, per unit surface area, is quite large compared to the rest of the engine. This region is often cooled by forced convection, a scheme that involves forcing the coolant through small channels located in the wall of the engine. This method typically requires a great deal of pressure. In some engines this pressure is obtained at the expense of engine performance.

SUMMARY OF THE INVENTION

Embodiments of the invention include a rocket engine having a combustion chamber with a chamber inner wall, a throat with a throat inner wall, and a nozzle with a nozzle inner wall. The chamber inner wall is a vacuum plasma sprayed, the throat inner wall is the vacuum plasma sprayed metal, and the nozzle inner wall is the vacuum plasma sprayed metal. A porosity of the vacuum plasma sprayed metal varies in an axial direction of the engine.

The variable porosity is designed to act for both structural considerations and as a pressure distribution manifold, capable of delivering a known pressure drop, and thus flow, within the variable porosity area.

Embodiments of the invention include a rocket engine having a combustion chamber with a chamber inner wall, a throat with a throat inner wall, and a nozzle with a nozzle inner wall. The chamber inner wall is a vacuum plasma sprayed metal, possibly porous to allow transpiration cooling, the throat inner wall is a vacuum plasma sprayed metal having a variable porosity in the axial direction to allow specific transpiration cooling in this area of increased heat flux, and the nozzle inner wall is a vacuum plasma sprayed metal, possibly porous to allow transpiration cooling as well.

Other embodiments of the invention include methods of fabricating a rocket engine. An example of such a method includes vacuum plasma spraying a first metal onto a throat region of a mandrel to form a throat inner wall, vacuum plasma spraying the first metal onto a combustion chamber region of the mandrel to form a chamber inner wall, and vacuum plasma spraying the first metal onto a nozzle region of the mandrel to form a nozzle inner wall. A second metal is vacuum plasma sprayed onto the throat inner wall, the chamber inner wall, and the nozzle inner wall to form an intermediate layer. A cooling channel is formed in the intermediate layer and the cooling channel is filled with a removable material. A third metal is vacuum plasma sprayed onto the intermediate layer and the removable material to form a closeout layer and the removable material is removed. A porosity of the first metal varies in an axial direction of the engine.

Other embodiments of the invention include methods of cooling a rocket engine. An example of such a method includes passing a coolant through a cooling channel, passing the coolant from the cooling channel to a porous throat inner wall of the engine, and passing the coolant through the throat inner wall to a throat of the engine by transpiration. The coolant passing through the cooling channel cools a combustion chamber inner wall of the engine by convection and a nozzle inner wall of the engine by convection. The coolant passing through the throat inner wall cools the throat by transpiration. The combustion chamber inner wall is formed by vacuum plasma spraying, the nozzle inner wall is formed by vacuum plasma spraying, and the throat inner wall is formed by vacuum plasma spraying. A porosity of the vacuum plasma sprayed metal varies in an axial direction of the engine.

DETAILED DESCRIPTION OF PREFERRED EMBODIMENTS

Figure 1:
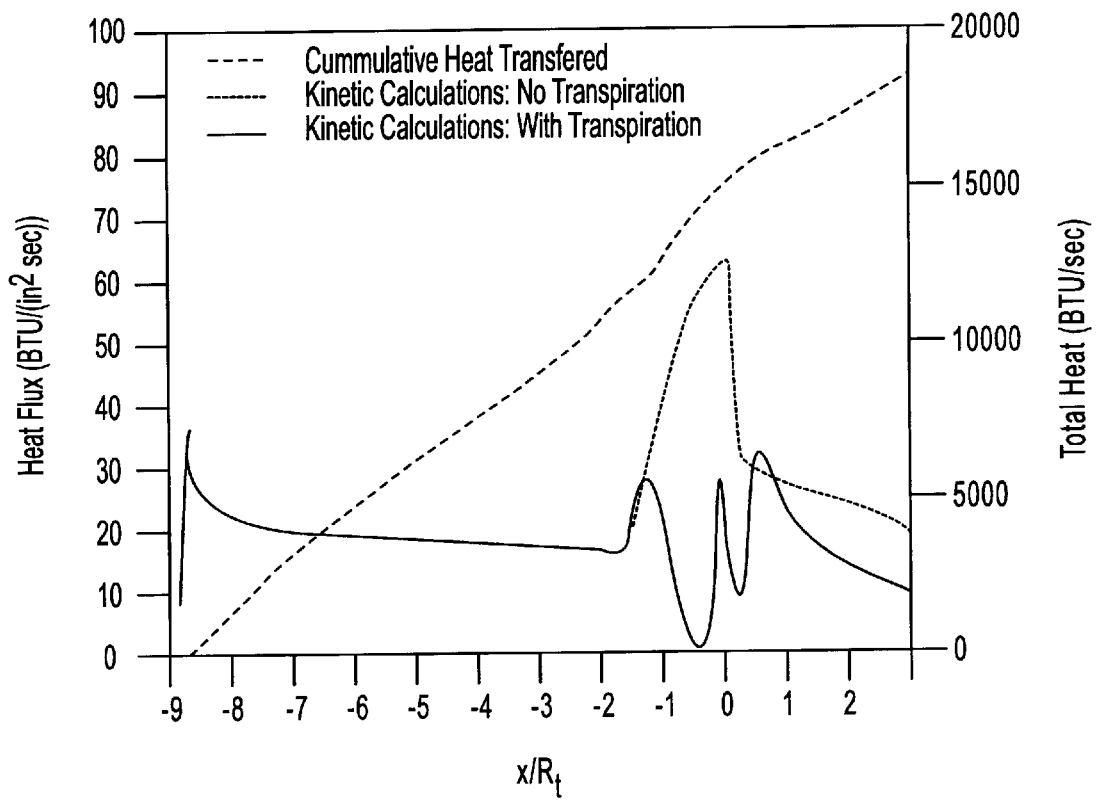
FIG. 1 is a plot of heat flux profiles with and without transpiration cooling.

Unlike forced convection, transpiration cooling is accomplished by allowing a small amount of cooling fluid to diffuse through the rocket chamber wall. When the fluid reaches the hot interior wall it evaporates and in the process absorbs heat. If enough coolant is transpired, all the heat that would normally go into the chamber wall is absorbed. The pressure required to cool a rocket throat in this way does not directly impact engine performance, like the pressure required for forced convection. However, if too much coolant is used, or if the transpiration process is inefficient, engine performance can be indirectly impacted. One of the benefits of the invention is that the coolant mass flux can be carefully tailored to provide for a very efficient transpiration process thereby maximizing overall engine performance.

There is an opportunity that now exists involving the use of vacuum plasma sprayed (VPS) porous metals to fabricate a low cost transpiration cooled throat for bipropellant rocket engines. The invention is not limited to only the fabrication techniques offered by VPS porous metals, as alternate technologies exist to create such structures, such as, for example, selective laser sintering (SLS). However, for the purpose of illustrating the invention, the VPS process will be the method discussed. The use of transpiration cooling for the high pressure-drop region of the throat should allow for increased performance and longer engine life, while decreasing unit cost. The pressure savings afforded by this technique can be used to either increase chamber pressure, thereby increasing performance, or decrease pump output requirements, thereby increasing turbopump life.

In the past, the use of porous materials, such as regimesh and sintered metals, for transpiration cooling was restricted due to poor flow control. In these materials, the coolant would take the path of least resistance and flow away from hot spots to colder areas that provided a low-pressure path. This problem has now been overcome for thrust chamber cooling applications. Utilizing an innovative process, the porosity of VPS metals can be varied axially along a chamber allowing the transpiration mass flux to match the throat heat flux profile. In addition, the plasma spray process allows for a regeneratively cooled combustion chamber and transpiration cooled throat to be fabricated together as a near net shape object thereby reducing engine cost, complexity and weight.

The invention makes it possible to combine mechanical simplicity and spatial control utilizing a VPS fabrication method that allows for the application of variable porosity metals as near net shape objects. This process will lead to a simpler, more efficient transpiration cooling solution and thrust chamber fabrication process.

In order for the United States to maintain a decisive edge in the control and use of space, a decrease in the cost to transport mass to low-Earth-orbit is essential. Increasingly, the ability to dominate the battlefield environment will require that space-based conmmunications, early-warning, navigation, weather data and reconnaissance capabilities be continually upgraded. In addition, decreasing the cost of access to space is a goal of the domestic aerospace industry, which hopes to regain a leadership position in the global commercial launch market.

To achieve the overall goal of reducing the cost of space launch for commercial and military sectors, initiatives are required that focus efforts on reducing the cost of launch vehicle subsystems. One such initiative is the Integrated High Payoff Rocket Propulsion Technology Program (IHPRPT) which is attempting to double the performance of rocket propulsion systems over the current state of the art while at the same time reducing cost. It is not an accident that the focus in recent years has been on propulsion, as traditionally the cost of propulsion systems accounts for almost half of the launch vehicle cost.

Various engine development initiatives have been undertaken due to the identification of a specific need. Particularly that future expendable launch vehicles (ELVs) and reusable launch vehicles (RLVs) will require propulsions systems with a higher performance to cost ratio than is currently available. It should be noted that engine manufacturers have made important strides in the reduction of cost and complexity while maintaining good performance. This has been accomplished for the most part without any advanced cooling techniques or methods. It is believed that even greater increases in performance are possible if the transpiration cooling innovations identified herein are taken into account.

The invention will provide future rocket propulsion systems with additional performance, operating life, and reliability, without additional cost, to meet both the boost and upper stage propulsion needs of military and commercial launch service providers.

It was mentioned previously that the opportunity presented by the incorporation of a VPS porous metal transpiration throat was the potential for increased rocket engine performance and/or life. These benefits can be clearly highlighted if one considers liquid oxygen (LOX) expander cycle engines. LOX expander cycle rocket engines utilize the energy absorbed by the coolant, in this case liquid oxygen, to drive the propellant pumps, which produce the propellant pressure required to run the engine. LOX expander cycle engines are normally performance limited due to limited heat capacity of the LOX and the pressure drop in the regenerative cooling circuit. Eliminating the high pressure-drop/high heat flux region at the throat through the use of transpiration cooling can allow both of these limitations to be circumvented. By significantly reducing the cooling circuit pressure requirements, it is possible for a LOX expander cycle engine, with kerosene as the fuel, to approach the performance level of a LOX/kerosene staged combustion cycle engine without the need for the added complexity and cost of a preburner.

Figure 2:
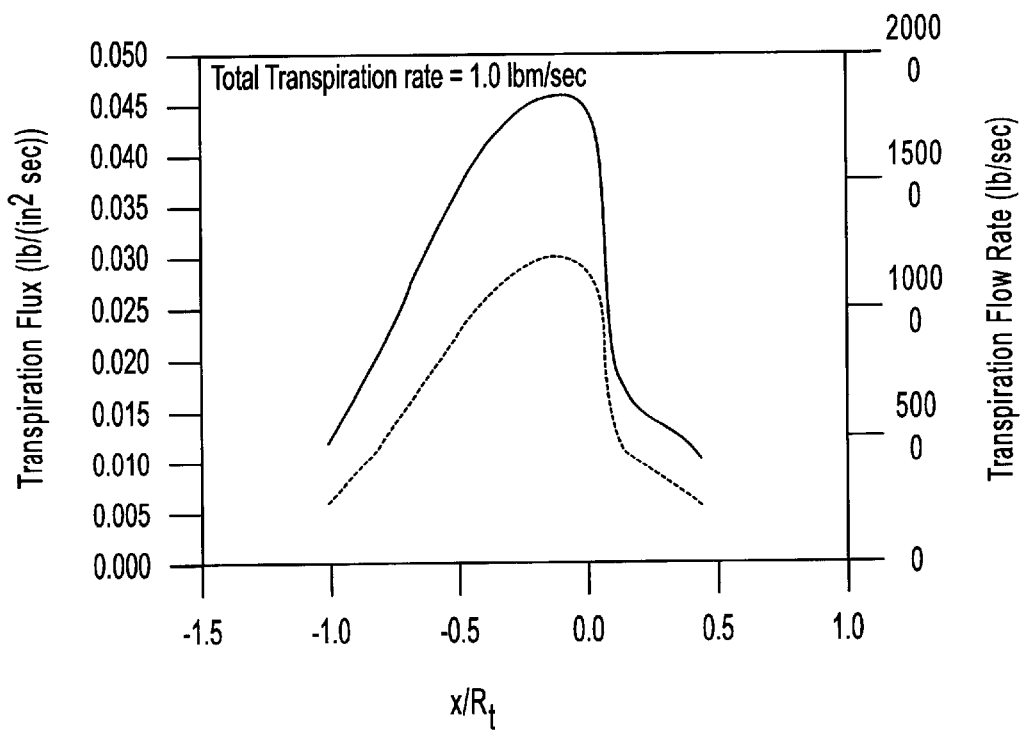
FIG. 2 is a plot of transpiration mass flux distribution.
Figure 3:
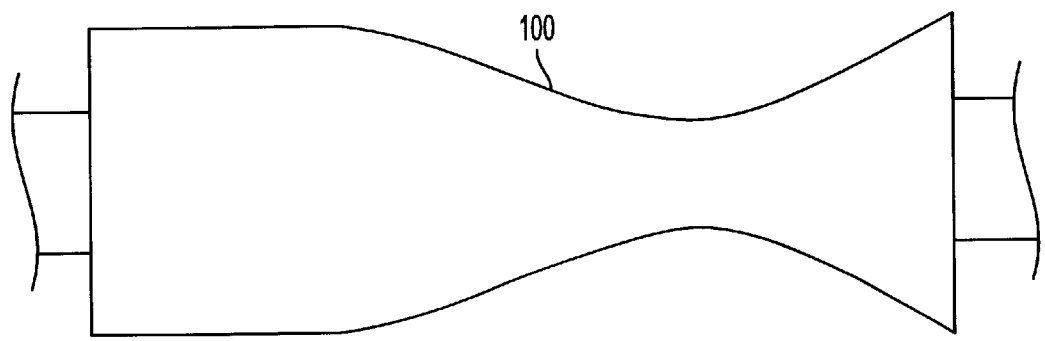
FIG. 3 is a side view of a mandrel in accordance with the invention.

Depending on engine geometry, the coolant pressure drop near the throat can account for greater than 60% of the total regenerative cooling circuit pressure change. Given this fact, the goal is to efficiently transpiration cool a region of the throat large enough to reduce the required cooling circuit pressure budget by at least half. This can be accomplished by tailoring the transpiration mass flux to match the anticipated heat flux profile. FIG. 1 is a plot of the heat flux profiles for one possible engine configuration. This plot highlights the heat flux distribution with and without transpiration cooling at the throat. The transpiration mass flux distribution used in this example is shown in FIG. 2. These preliminary calculations were performed using TDK, a 2-D kinetic code.

Controlling porosity during vacuum plasma spraying can provide improved thrust chamber cooling. Examples of two techniques follow. The first technique employs modifying the VPS parameters such as power, gas flow, and raw material sizing. This technique can give controllable porosity up to at least 30%. For higher, more uniform porosity and larger pore sizes, a second method, co-spray, is used. In the co-spray technique, a second phase material is trapped in the copper alloy hot wall surface. The second phase is controlled to give the desired pore size and distribution. Either a chemical or thermal process is then used to remove the second phase. The result is a controlled pore size for the transpiration coolant.

A purpose of the disclosed invention concerning a new method of fabricating a transpiration cooled throat for rocket engines is to enable the development of high performance, low cost rocket propulsion. The invention will mitigate the drawbacks inherent in current systems and allow for the development of a complete system that will meet the propulsion needs of future expendable and reusable launch vehicles.

Embodiments of the invention include fabricating a complete thrust chamber (combustion chamber, throat, and nozzle) as an integrated, near net shape object using a vacuum plasma spray (VPS) process. An example is a simple integrated cooling system that allows for coolant to transpire around the throat where the cooling requirements are most extreme, while the rest of the chamber, where the cooling requirements are less extreme, is cooled by forced convection. The VPS process, unlike sintering, allows for the forming of dense and porous structured super alloys, which have excellent high temperature thermo-mechanical properties. A benefit of VPS is that continuous density gradients, from high density solids to low density porous materials, can be fabricated in a single process. The materials used in these applications can be, for example, dispersion strengthened copper and nickel based alloys.

Figure 4:
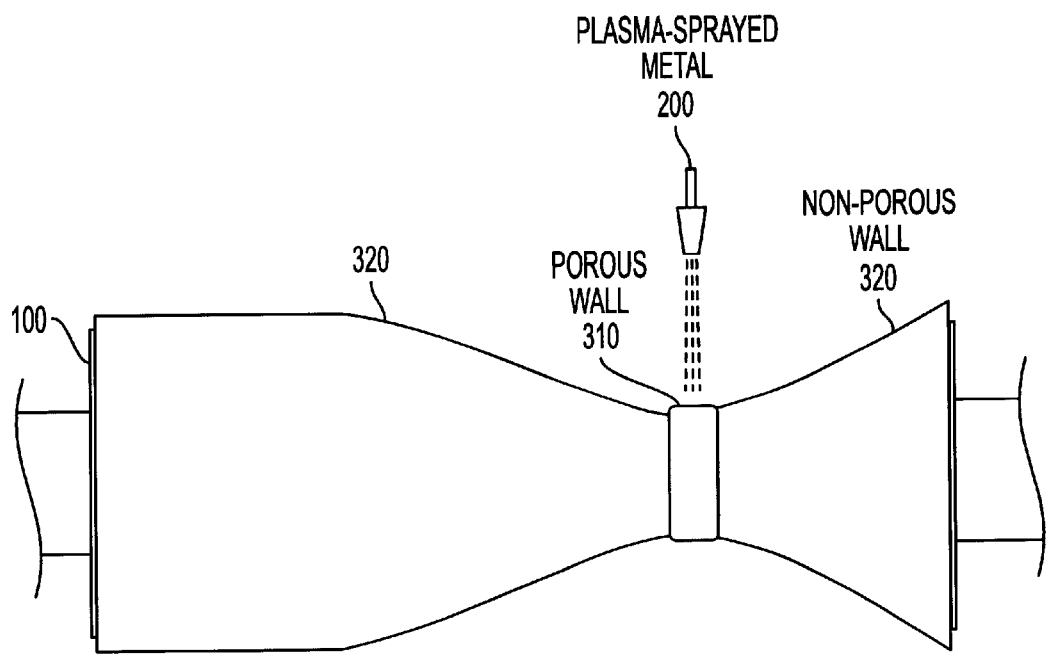
FIG. 4 is a side view of a step in a method in accordance with the invention.

FIGS. 3–7 show an example of a fabrication process in accordance with the invention. First, a mandrel 100 is made with an outside contour that is the same as the inside contour of the thrust chamber wall. The inside wall of the thrust chamber is then created by plasma spraying material on to the mandrel to the proper depth. This wall is everywhere made of high density, high thermal conductivity material except for, for example, approximately two inches around the throat, where a plasma spray gun 200 is adjusted to apply porous material 310, as shown in FIG. 4. The porous material around the throat has a predetermined varying porosity that will allow the transpiration cooling flow to match the anticipated axial heat flux variations. At the boundary of the porous section at both ends of the throat, there is a smooth transition to the high density, nonporous section of the wall 320.

Figure 5:
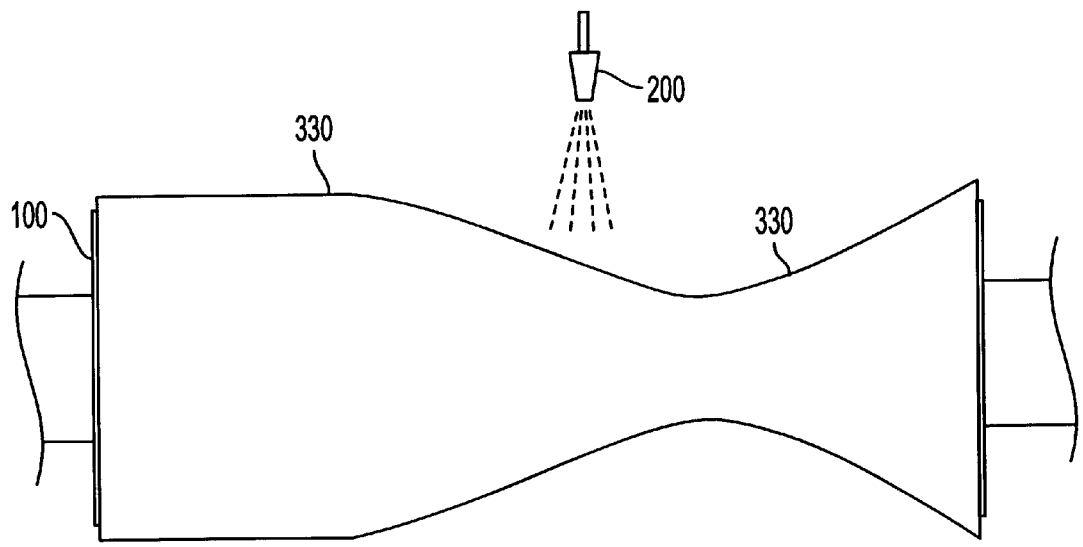
FIG. 5 is a side view of a step in a method in accordance with the invention.
Figure 6:
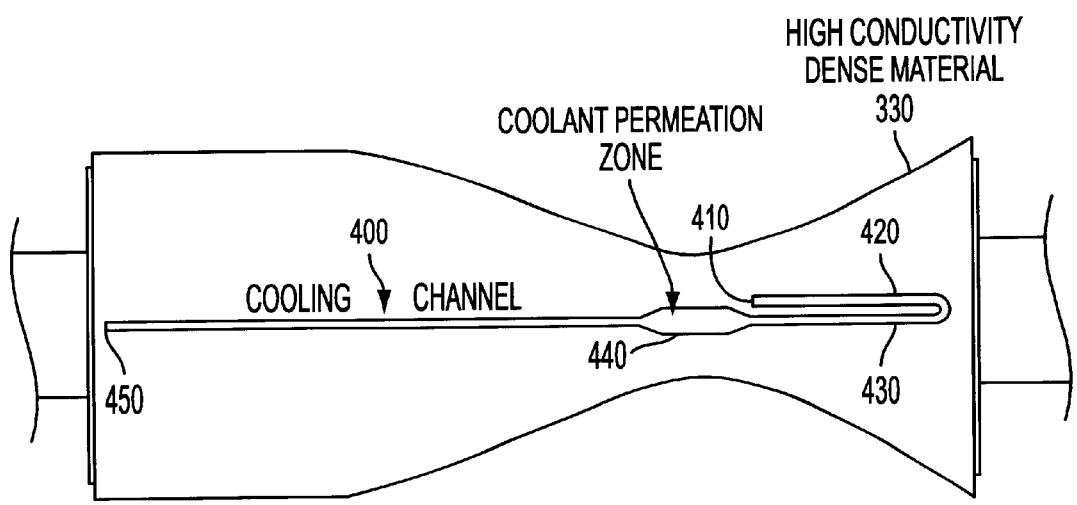
FIG. 6 is a side view of a step in a method in accordance with the invention.

As shown in FIG. 5, after the inner wall is fabricated, a layer of dense, high conductivity material 330 is plasma sprayed on top of the thrust chamber inner wall to a predetermined depth. As shown in FIG. 6, using any number of machining techniques, axial channels 400, distributed circumferentially, are then formed in high conductivity material 330 to allow for forced convection cooling around the combustion chamber and nozzle. In a preferred embodiment, these axial channels will be arranged such that the coolant enters downstream of the throat in the nozzle at location 410. The coolant then flows in section 420 to the bottom of the nozzle where the flow is redirected 180° and makes a second pass through the nozzle in section 430. In this configuration the upward and downward flowing channels alternate circumferentially around the nozzle. The return channels 430 then continue upward past the coolant inlet station 410, directing the coolant over the inner wall of the throat and combustion chamber, with the flow finally exiting the cooling circuit at the top of the combustion chamber 450. For clarity, only one cooling circuit is shown. It is understood, however, that a plurality of cooling circuits are located around the engine.

Figure 8:
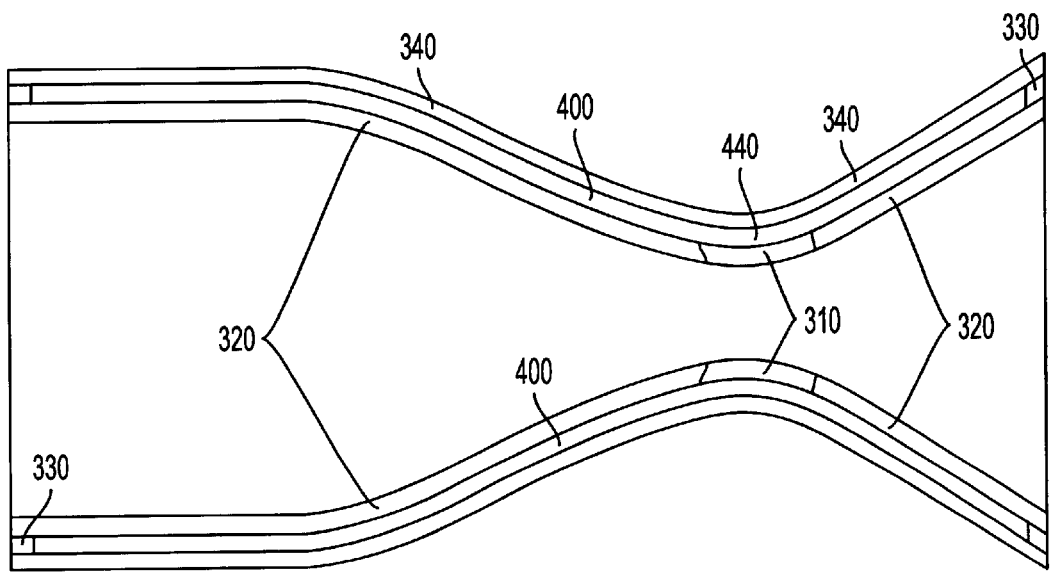
FIG. 8 is a partial sectional view of an example of a rocket engine in accordance with the invention.

In the region of the throat, the axial channels are given sufficient cross sectional area to minimize the hydrodynamic pressure loss. This cross sectional area is represented in the figures by region 440 shown in FIGS. 6 and 8. These channels are cut to a predetermined depth such that the porous inner wall is exposed to the cooling flow. As a result, some of the coolant that is in the regenerative cooling circuit 400 will permeate the wall around the throat to provide for transpiration cooling instead of forced convection cooling. In this way, the same cooling circuit, i.e. the channels 400, that provide for forced convection cooling in the nozzle and combustion chamber, will provide for the transpiration cooling of the throat.

Figure 7:
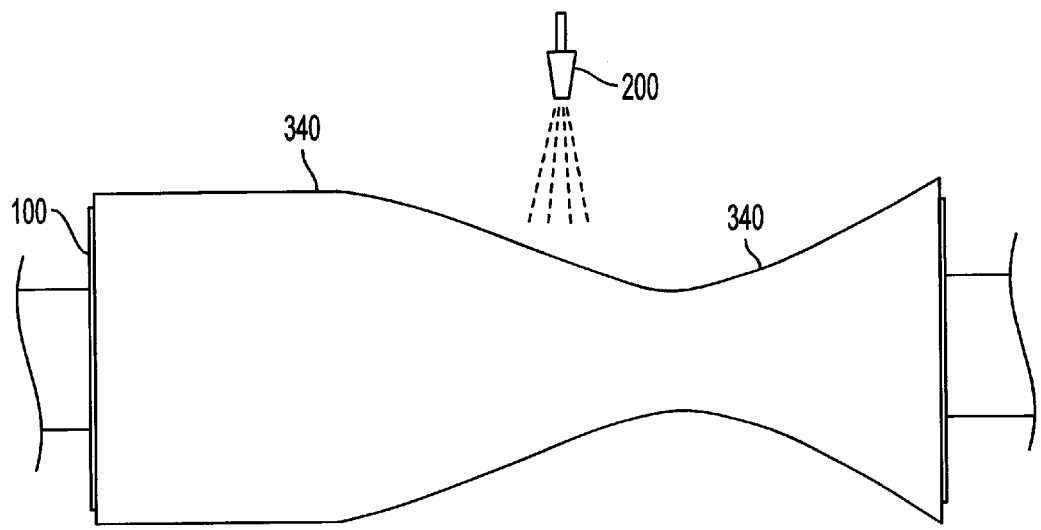
FIG. 7 is a side view of a step in a method in accordance with the invention.

After the cooling channels 400 are formed, they are filled with a removable material, such as mild steel. As shown in FIG. 7, a last layer of material 340 is then plasma sprayed on to the thrust chamber to increase structural integrity and close out the axial channels. The closeout layer 340 can be formed of a high strength material such as monel or inconel. After all the layers have been sprayed, the chamber is hot isostatically pressed to consolidate the plasma sprayed material and provide stress relief.

After the closeout 340 is formed, the filler in the axial channels, as well as the mandrel, is removed through a chemical etching or other appropriate process.

The fabrication process described herein is considered to be a preferred embodiment of the disclosed invention and is not the only possible means of implementing said invention. Other suitable methods and materials may exist and the description of one particular process does not in any way imply that there is only one possible solution for using VPS variable porosity materials in rocket engine cooling applications. For example, more than one metal can be used in any layer or portion of the engine. Also, the porosity of the metal or metals can vary in a radial direction of the engine as well as an axial direction of the engine.

What is claimed is:

1. A rocket engine, comprising:
   a combustion chamber having a chamber inner wall;
   a throat having a throat inner wall; and
   a nozzle having a nozzle inner wall,
   wherein, the chamber inner wall is a vacuum plasma sprayed metal,
   the throat inner wall is the vacuum plasma sprayed metal,
   the nozzle inner wall is the vacuum plasma sprayed metal, and
   a porosity of the vacuum plasma sprayed metal varies in an axial direction of the engine.

2. The engine of claim 1, wherein the porosity of the chamber inner wall is such that rocket propellant will not penetrate the chamber inner wall.

3. The engine of claim 1, wherein the porosity of the throat inner wall is such that a coolant passes through the throat inner wall and into the throat by transpiration.

4. The engine of claim 1, wherein the chamber inner wall, the throat inner wall, and the nozzle inner wall are covered by a vacuum plasma sprayed intermediate layer.

5. The engine of claim 4, wherein the intermediate layer is a dense, high conductivity material.

6. The engine of claim 5, further comprising a cooling channel formed in the intermediate layer,
   the cooling channel providing a passage for a coolant to flow through the intermediate layer and contact the throat inner wall and the chamber inner wall.

7. The engine of claim 6, wherein the porosity of the throat inner wall is such that the coolant passes through the throat inner wall and into the throat by transpiration.

8. The engine of claim 7, further comprising a vacuum plasma sprayed closeout layer on top of the intermediate layer.

9. The engine of claim 7, wherein the cooling channel has a throat inner wall contact area at which the cooling channel contacts the throat inner wall, the throat inner wall contact area having a width in a circumferential direction of the engine, and
   the width of the throat inner wall contact area of the cooling channel varies along the axial direction of the engine.

10. The engine of claim 9, wherein the width of the throat inner wall contact area of the cooling channel varies along the axial direction of the engine such that a substantially uniform pressure head is maintained in the throat.

11. The engine of claim 10, wherein a first one of the various points on the throat inner wall has an individual cooling requirement different than an individual cooling requirement of a second point on the throat inner wall.

12. A method of fabricating a rocket engine, the method comprising:
   vacuum plasma spraying a first metal onto a throat region of a mandrel to form a throat inner wall;
   vacuum plasma spraying the first metal onto a combustion chamber region of the mandrel to form a chamber inner wall;

vacuum plasma spraying the first metal onto a nozzle region of the mandrel to form a nozzle inner wall;

vacuum plasma spraying a second metal onto the throat inner wall, the chamber inner wall, and the nozzle inner wall to form an intermediate layer;

forming a cooling channel in the intermediate layer;

filling the cooling channel with a removable material;

vacuum plasma spraying a third metal onto the intermediate layer and the removable material to form a closeout layer; and removing the removable material, wherein, a porosity of the first metal varies in an axial direction of the engine.

13. The method of claim 12, wherein the porosity of the chamber inner wall is such that rocket propellant will not penetrate the chamber inner wall.

14. The method of claim 12, wherein the porosity of the throat inner wall is such that a coolant passes through the throat inner wall and into the throat by transpiration.

15. The method of claim 12, wherein the intermediate layer is a dense, high conductivity material.

16. The method of claim 12, wherein the cooling channel provides a passage for a coolant to flow through the intermediate layer and contact the throat inner wall and the chamber inner wall.

17. The method of claim 16, wherein the porosity of the throat inner wall is such that the coolant passes through the throat inner wall and into the throat by transpiration.

18. The method of claim 17, wherein the cooling channel has a throat inner wall contact area at which the cooling channel contacts the throat inner wall, the throat inner wall contact area having a width in a circumferential direction of the engine, and the width of the throat inner wall contact area of the cooling channel varies along the axial direction of the engine.

19. The method of claim 18, wherein the width of the throat inner wall contact area of the cooling channel varies along the axial direction of the engine such that a substantially uniform pressure head is maintained in the throat.

20. The method of claim 19, wherein a first one of the various points on the throat inner wall has an individual cooling requirement different than an individual cooling requirement of a second point on the throat inner wall.

21. A method of cooling a rocket engine, the method comprising:

passing a coolant through a cooling channel;

passing the coolant from the cooling channel to a porous throat inner wall of the engine; and passing the coolant through the throat inner wall to a throat of the engine by transpiration, wherein, the coolant passing through the cooling channel cools a combustion chamber inner wall of the engine by convection, the coolant passing through the cooling channel cools a nozzle inner wall of the engine by convection, the coolant passing through the throat inner wall cools the throat by transpiration, the combustion chamber inner wall is formed by vacuum plasma spraying, the nozzle inner wall is formed by vacuum plasma spraying, the throat inner wall is formed by vacuum plasma spraying, and a porosity of the vacuum plasma sprayed metal varies in an axial direction of the engine.

* * * * *